United States Patent [19]
Abukawa et al.

[11] Patent Number: 4,794,291
[45] Date of Patent: Dec. 27, 1988

[54] PERMANENT MAGNET FIELD DC MACHINE

[75] Inventors: Toshimi Abukawa, Hitachioota; Kazuo Tahara; Noriyoshi Takahashi, both of Hitachi; Toshio Tomite, Katsuta, all of Japan

[73] Assignee: Hitachi, Ltd., Tokyo, Japan

[21] Appl. No.: 26,259

[22] Filed: Mar. 16, 1987

[30] Foreign Application Priority Data

Mar. 17, 1986 [JP] Japan ................................. 61-56824

[51] Int. Cl.$^4$ .............................................. H02K 21/26
[52] U.S. Cl. ...................................... 310/154; 310/46; 310/185; 310/258
[58] Field of Search ............... 310/152, 154, 46, 177, 310/89, 254, 258, 261, 233, 185

[56] References Cited

U.S. PATENT DOCUMENTS

| | | | |
|---|---|---|---|
| 3,277,324 | 10/1966 | Beudoin | 310/154 |
| 3,939,371 | 2/1976 | Murakami | 310/154 |
| 4,278,907 | 7/1981 | Landgraf | 310/154 |
| 4,471,252 | 9/1984 | West | 310/154 |
| 4,542,314 | 9/1985 | Corbach | 310/154 |
| 4,639,625 | 1/1987 | Abukawa et al. | 310/154 |

FOREIGN PATENT DOCUMENTS

| | | | |
|---|---|---|---|
| 1185276 | 1/1965 | Fed. Rep. of Germany | 310/154 |
| 2550416 | 5/1977 | Fed. Rep. of Germany | 310/154 |
| 2637705 | 2/1978 | Fed. Rep. of Germany | 310/154 |
| 0153558 | 9/1982 | Japan . | |

*Primary Examiner*—R. Skudy
*Attorney, Agent, or Firm*—Antonelli, Terry & Wands

[57] ABSTRACT

A permanent magnet field DC machine comprises a rotor and a stator. The rotor comprises an armature core (3), an armature winding (4), and a commutator (2). The stator comprises a yoke (7), permanent magnets (8) disposed on the inner periphery of the yoke (7), and magnetic pole pieces (9) interposed between the yoke (7) and a portion of each magnetic pole (8). The magnetic pole pieces (8) are made of a material the permeability of which is greater than that of the permanent magnets.

10 Claims, 8 Drawing Sheets

FIG. 20
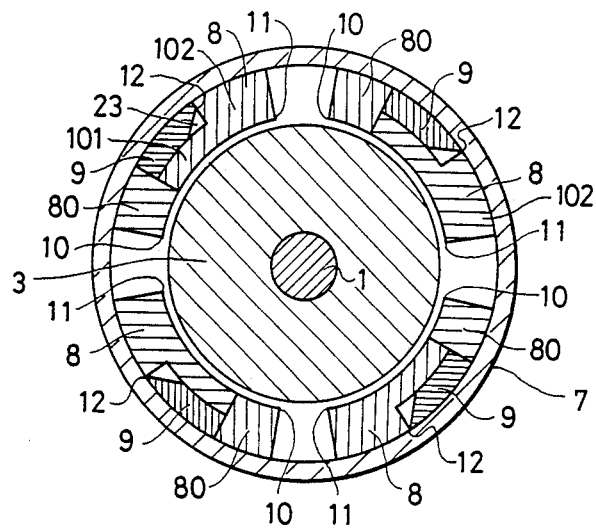
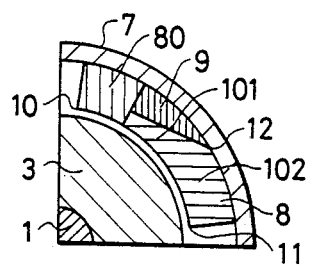
FIG. 21
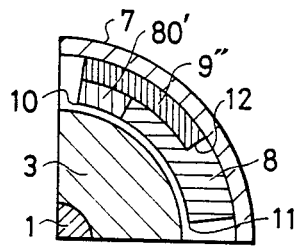
FIG. 22
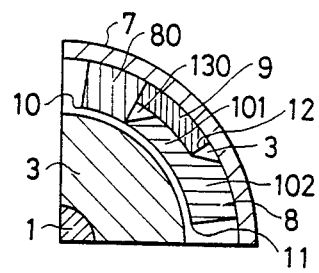
FIG. 23
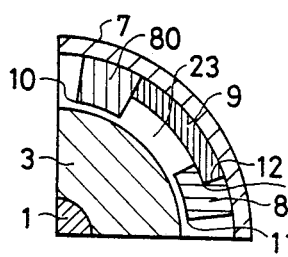
FIG. 24
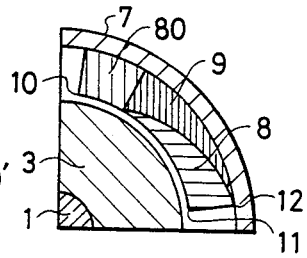
FIG. 25

PERMANENT MAGNET FIELD DC MACHINE

FIELD OF THE INVENTION

This invention relates to the so-called permanent magnet field DC machine which employs a field system of permanent magnets.

BACKGROUND OF THE INVENTION

The amount of a magnetic flux relative to the armature current is substantially constant in conventional permanent magnet field DC motors having a field system constituted by permanent magnets alone. For this reason, the machine of this kind displays shunt-winding characteristics as the output characteristics thereof and is not capable of generating sufficient torque during starting when a larger current flows therethrough. Another type of permanent magnet field DC machine which is designed in consideration of the magnetomotive force due to the armature reaction is disclosed in Japanese Patent Laid-Open No. 153558/1982 published on Sept. 22, 1982 under the title of "permanent magnet field starter with auxiliary poles". This type of machine has auxiliary poles made of a magnetic material such as soft steel disposed in parallel with permanent magnets in the peripheral direction.

However, according to the conventional methods, the machine cannot generate a sufficiently large starting torque when it starts, and the rotational speed of the machine in the non-loaded state is small because the amount of torque generated by the permanent magnets is significantly large when the machine has no load. For this reason, when the permanent magnet field DC machine is employed as a vehicle starter motor, it acts as a load on an engine of the vehicle after starting the engine while being in the non-loaded state. For the purpose of increasing the starting torque, it is necessary to provide larger areas of the permanent magnets. When rare-earth magnets such as samarium cobalt magnets or neodymium group magnets are employed as the material of the permanent magnets for obtaining same magnetic flux as ferrite magnets and thin magnets, the cost of the field poles thereof is increased, since it is necessary to provide large areas of the permanent magnets.

SUMMARY OF THE INVENTION

An object of the present invention is to provide a permanent magnet field DC machine which can generate a larger torque under high load, for instance, during starting, and which can rotate at a higher rotational speed in the non-loaded state.

The present invention provides a permanent magnet field DC machine having magnetic pole pieces made of a magnetic material whose permeability is greater than the reversible permeability of permanent magnets and whose thickness defined at the magnetizing end is larger than that defined on the demagnetizing side.

In the above-described arrangements, each of the magnetic pole pieces made of a magnetic material is formed so as to reduce the magnetic gap between the magnetic pole piece and the armature core on the magnetizing side, thereby efficiently utilizing the magnetizing effect of the armature reaction and enabling the field poles to generate great magnetic flux at the time of starting or under high-load when the armature current is large, and to reduce the amount of the magnetic flux in the non-loaded state or under small load when the armature current is small. Thus, the present invention ensures that the starting torque of the permanent magnet field DC machine can be increased as well as the rotational speed in the non-load state of the machine.

BRIEF DESCRIPTION OF THE DRAWINGS

FIGS. 19 to 25 are radial cross sections of other embodiments relating to FIG. 14 of the present invention.

DETAILED DESCRIPTION OF THE PREFERRED EMBODIMENTS

Figure 1:
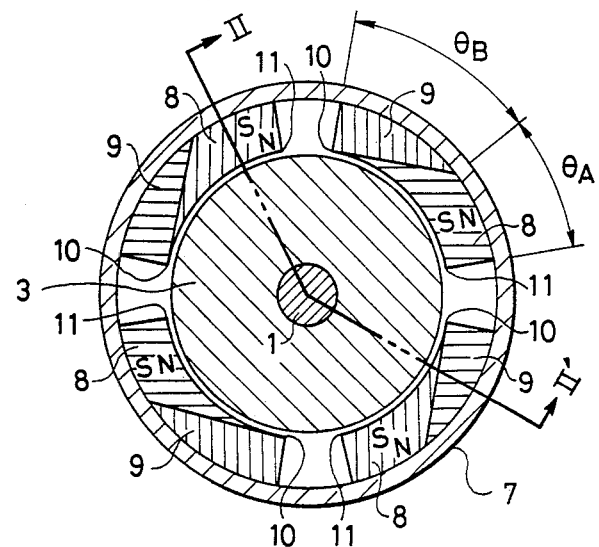
FIG. 1 is a radial cross section taken along I—I' of FIG. 2 of a permanent magnet field motor in accordance with one embodiment of the present invention.
Figure 2:
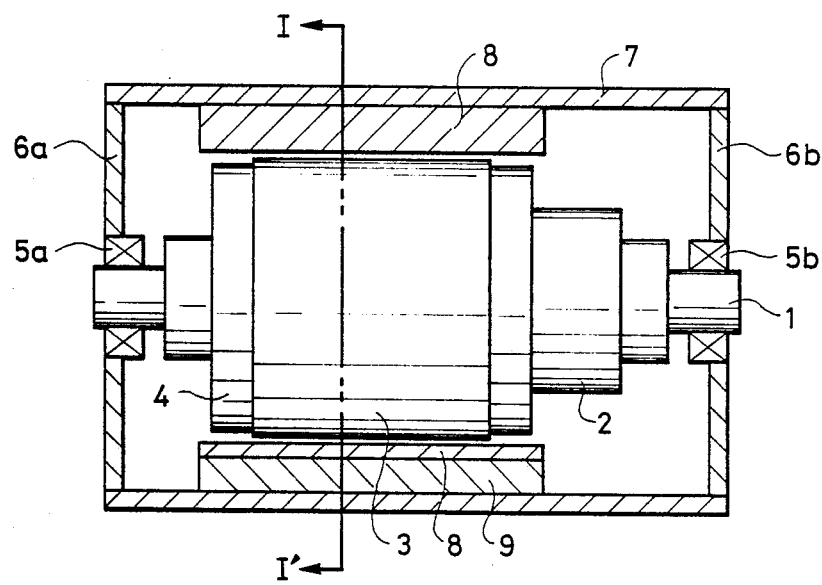
FIG. 2 is a partial axial cross section of the motor taken along II—II' of FIG. 1.

Referring to FIGS. 1 and 2, a rotor consisting of a shaft 1, a commutator 2 and an armature consisting of an armature core 3 and a coil 4 wound around the armature core 3 is supported on end brackets 6a and 6b by bearings 5a and 5b. The end brackets 6a and 6b are fixed as securing members to a cylindrical yoke 7. Permanent magnets 8 consisting of, e.g., ferrite magnets, and magnetic pole pieces 9 are disposed around the inner periphery of the cylindrical yoke 7. The thickness of each of these permanent magnets 8 in the radial direction is greatest over a portion thereof defined by an angle $\theta_A$ on a demagnetizing side, and gradually decreases over a portion defined by an angle $\theta_B$ from the demagnetizing side toward a magnetizing end 10 thereof. The magnets 8 face the armature core 3 with a gap therebetween. A magnetic pole piece 9 made of a magnetic material such as soft steel which has a high permeability is disposed between the yoke 7 and the portion of the permanent magnet 8 defined by the angle $\theta_B$. The thickness of each of the magnetic pole pieces 9 in the radial direction is greatest at each magnetizing end 10 and gradually decreases from the magnetizing side end 10 toward the corresponding demagnetizing side. Therefore, the magnetic gap formed between each magnetic pole piece 9 and the armature core 3 is smallest at the magnetizing end 10 and increases toward the demagnetizing side.

Figure 3:
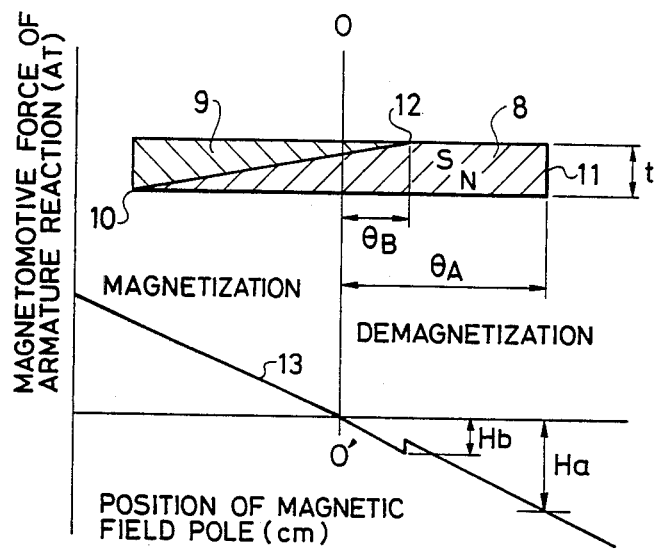
FIG. 3 is a diagram of the distribution of armature reaction applied to the magnetic field pole shown in FIG. 1.

In the embodiment thus arranged, the magnetomotive force of the armature reaction acts on the field poles when the armature coil is energized. As shown in FIG. 3, the magnetomotive force of the armature reaction acts as a magnetizing force on the left hand side of the center of magnetism 0-0' and as a demagnetizing force on the right hand side, when a current flows through the armature coil in the direction from behind the plane of the figure to the front.

Generally, the demagnetizing force Ha is expressed by the following formula (1). It is in proportion to the angle $\theta$ from the center of magnetism and is reverse proportion to the thickness t of the magnet in the direction of the magnetization thereof.

$$H\alpha\theta/t \quad (1)$$

The demagnetizing force acting on the permanent magnet 8 has a maximum value of Ha. In this embodiment, as described above, the radial thickness of t is made larger so that the magnet can resist this demagnetizing force Ha. The intensity of the field system of the magnet is thereby maintained. A demagnetizing force also acts on a boundary portion 12 between each permanent magnet 8 and the corresponding magnetic pole piece 9, but the magnitude of the demagnetizing force $H_b$ is approximately Ha/3 at this portion, as shown in FIG. 3.

Figure 4:
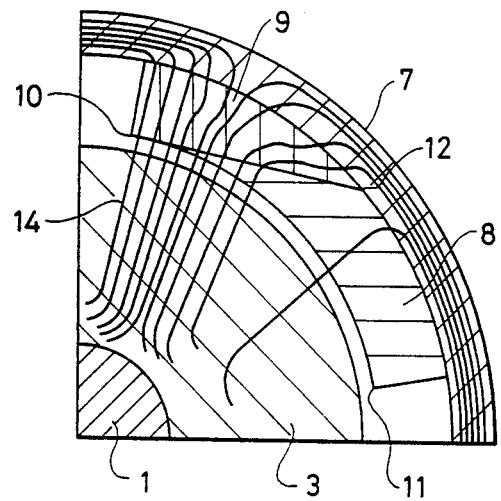
FIG. 4 is a magnetic flux distribution diagram of the motor of FIG. 1 during starting thereof.

The magnetic pole piece 9 disposed between each permanent magnet 8 and the yoke 7 is made from a magnetic material having a high permeability, as described above, so that it generates a large amount of magnetic flux because of the magnetizigg effect of the armature reaction when the armature current flows at a higher rate during starting or when under load. This state is shown in the magnetic flux distribution chart of FIG. 4. The magnetic pole piece 9 is formed so that its radial thickness increases from the boundary portion 12 of the demagnetizing side to the magnetizing end 10 thereof, so that the magnetic flux generated by the armature reaction is led to the magnetizing end 10. In addition, in this embodiment, the magnetizing end 10 faces the armature core 3 via a gap and the magnetic gap is narrow in the vicinity of the magnetizing end 10, so that the amount 13 of the magnetic flux is large at the magnetizing end 10 of the magnetic pole piece 9. Therefore, this arrangement ensures a larger amount 18 of magnetic flux during starting or under load, when the armature current flows at a higher rate, as expressed by a solid-line curve $\Phi_A$ in FIG. 5. This embodiment is free from the occurrence of short-circuited magnetic flux since the magnetic gap between each magnetic pole piece 9 and the armature core 3 is wide at about the center of magnetism thereof.

The radial thickness of the permanent magnet 8 is largest at the angle $\theta_A$ portion and gradually decreases toward the magnetizing end 10 over the angle $\theta_B$ portion, as described above. Accordingly, the cross sectional area of the permanent magnet 8 is small and the amount of magnetic flux generated from the permanent magnet 8 is reduced, as expressed by the solid-line curve $\Phi_M$ indicated by a numeral 16 in FIG. 5, while the amount of magnetic flux generated by a magnetic pole constituted by the permanent magnet alone is as expressed by the broken-line curve $\Phi_M$ indicated by a numeral 15.

Figure 5:
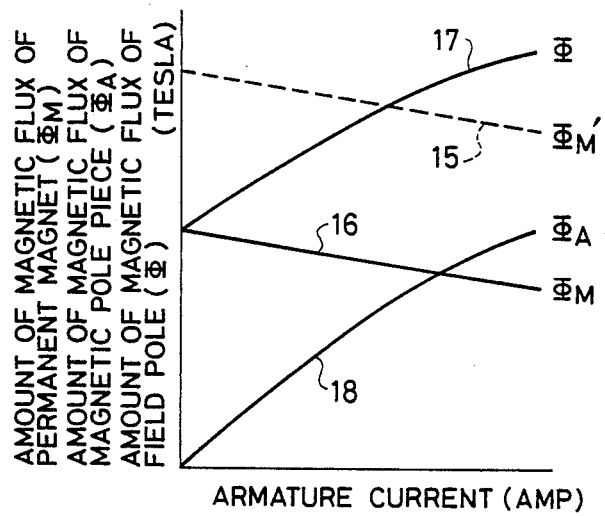
FIG. 5 is a characteristic diagram showing the amount of magnetic flux of a field pole corresponding to the armature current.
Figure 6:
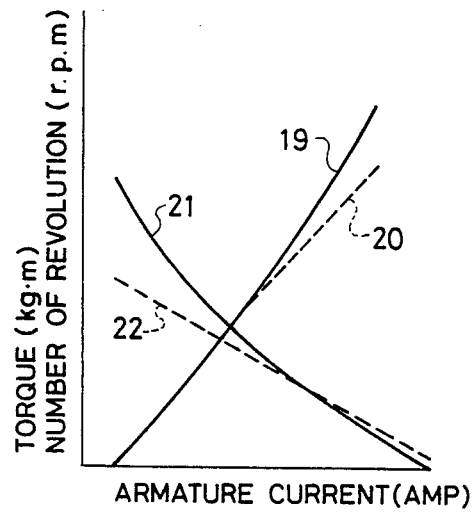
FIG. 6 is a characteristic diagram showing the torque and the rotational speed corresponding to the armature current.

However, as expressed by the curve $\Phi$ in FIG. 5, the amount of magnetic flux 17 of the field pole, which is the sum of the amounts of magnetic flux $\Phi_M$ and $\Phi_A$ generated by the permanent magnet 8 and the magnetic pole piece 9 is small in the substantially non-loaded state when the armature current is small, and it is large when the load and hence the armature current is large. When this embodiment is used for an electric motor, the motor exhibits a larger rotational speed 21 when it is not loaded and the armature current is small and can output a greatest torque 19 when it is started or is loaded when the armature current is large, as shown in FIG. 6. In FIG. 6, numerals 22 and 20 represent characteristic curves of rotational speed and torque versus armature current, respectively, in the conventional apparatus.

As described above, the cross sectional area of each permanent magnet 8 is small in this embodiment so that the weight of the permanent magnets can be reduced to a great extent. The magnetic pole piece 9 of this embodiment faces the armature core at the magnetizing end thereof, but its radial thickness decreases toward the demagnetizing side so that the magnetic gap is increased, thereby preventing the occurrence of eddy-current losses due to slot ripples. Therefore, there is no delay of the magnetic flux relative to the rise in the armature current.

The present invention has been described above with respect to a quadrupole permanent magnet field DC machine, but it is possible for the principle of the invention to be applied to other multi-pole machines such as dipole or six-pole machines. The present invention is effective for generators as well as electric motors. Each permanent magnet 8 is formed of a ferrite magnet in the above embodiment, but the material of the permanent magnet 8 is not limited as other kinds of materials such as samarium cobalt and neodymium magnets, which are rare-earth magnets, iron and boron magnets can be used. The material of each magnetic pole piece 9 may be laminated silicon steel plates or a ferrite core.

Figure 7:
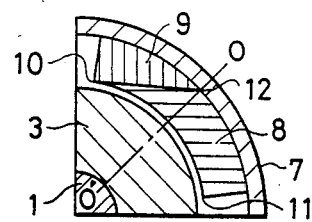
FIGS. 7 to 13 show radial cross sections of another embodiments relating to FIG. 1 of the present invention.
Figure 8:
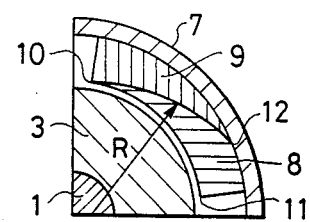
Figure 9:
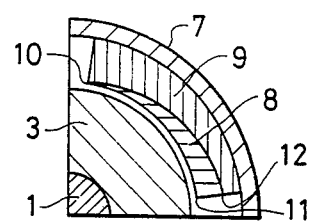
Figure 10:
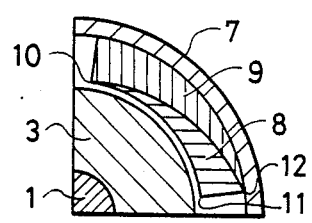
Figure 11:
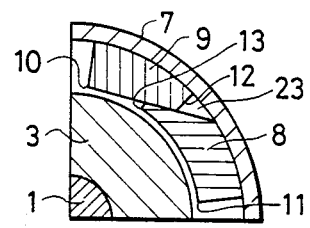
Figure 12:
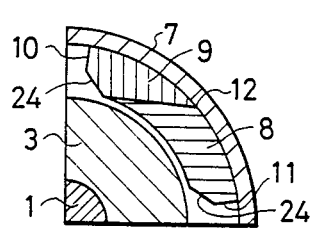

FIG. 7 shows an arrangement in which each magnetic pole piece 9 is disposed on the magnetizing side only, relative to the center of magnetism 0—0', whereby the same magnetizing effect of the present invention can be realized. FIGS. 8, 9, and 10 show other arrangements in which each line of the boundary between the magnetic pole piece 9 and the permanent magnet 8 is in the form of a circular arc. These arrangements also exhibit the same effects as that of the arrangement shown in FIG. 1. FIG. 11 shows still another arrangement in which portions of the permanent magnet 8 and the magnetic pole piece 9 having a small thickness are cut off so as to form a gaps 13 and 23, thereby preventing the damage of the edges of the permanent magnet 8 and the magnetic pole piece 9, and facilitating the manufacture of the permanent magnet 8 and the magnetic pole piece 9. FIG. 12 shows a still another arrangement in which edge portions of the permanent magnet 8 and the magnetic pole piece 9 which are oppositely located in the peripheral direction are cut off so that a magnetic density distribution in the form of a sine wave is provided in the gap between the field pole and the armature core, thereby reducing noise and vibrations of the motor.

Figure 13:
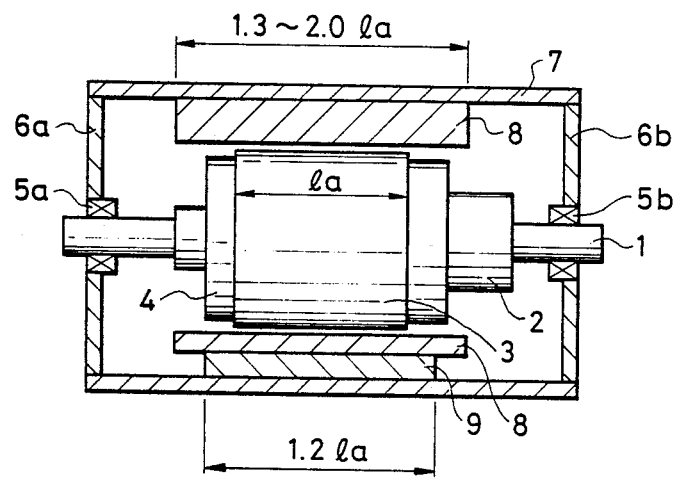

In the arrangement shown in FIGS. 1 and 2, the magnetic pole piece 9 and the permanent magnet 8 have the same axial length, but they can be different in length. That is, when an axial length la of the armature core is assumed, the axial length of the magnetic pole piece 9 is set to be about 1.2 la, as shown in FIG. 13, over which the magnetizing force of the armature reaction is distributed while the axial length of the permanent magnet 8 is set to be 1.3 la to 2.0 la. It is thereby possible to introduce a large amount of magnetic flux from the axial end of the permanent magnet 8, which is out of the effective range of the armature reaction, into the armature core, in the loaded state or during starting when the armature current flows at a higher rate. A larger amount of magnetic flux is thus obtained.

In the above described embodiment of the present invention, the magnetic pole piece whose thickness is decreased toward the demagnetizing side is formed at a portion of the permanent magnet so that the magnetizing effect of the armature reaction can be efficiently utilized, thereby obtaining a larger amount of magnetic flux when the current flows at a higher rate. In addition, the amount of magnetic flux generating from the permanent magnet is reduced, as the area of the permanent magnet is small. Accordingly, a motor having the field pole in accordance with the present invention exhibits a direct-winding characteristic with which the motor can output a larger torque, when the current flows at a high rate, and can rotate at a high rotational speed in the non-loaded state, when the current thereof flows at a small rate. The motor can thereby be reduced in size and manufacturing cost. In addition, it is possible to greatly reduce the cost of the magnets when rare-earth magnets are used whose cost per weight is high, since the weight of the permanent magnet is reduced according to the invention.

Figure 14:
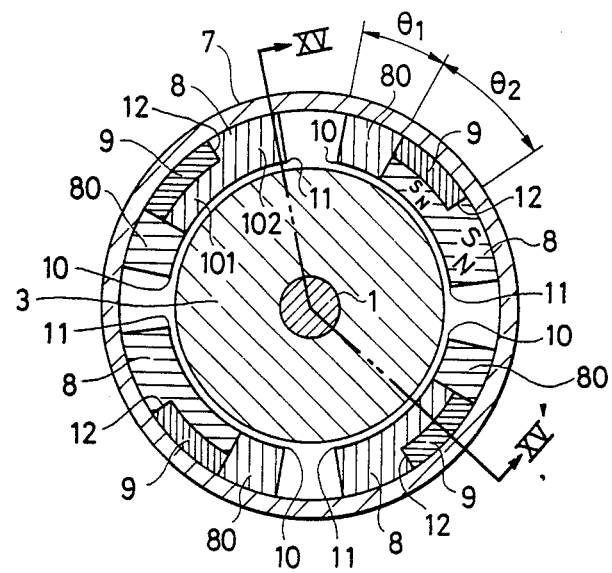
FIG. 14 is a radial cross section taken along XIV—XIV' of FIG. 15 of a permanent magnet field motor with auxiliary poles in accordance with the present invention.
Figure 15:
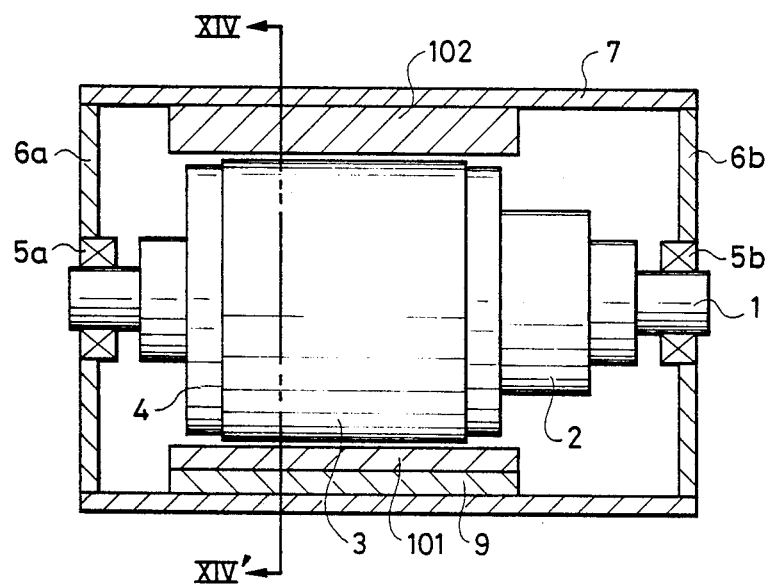
FIG. 15 is a partial axial cross section of the motor taken along XV—XV' of FIG. 14.

Next, another embodiment of the permanent magnet field DC machine according to the present invention will be described with reference to the accompanying drawings. FIG. 14 is a radial cross section through a quadrupole permanent magnet field DC machine with auxiliary poles, and FIG. 15 is an axial cross section of the same. As shown in FIGS. 14 and 15, a rotor consisting of a shaft 1, a commutator 2 and an armature consisting of an armature core 3 and a coil 4 wound around the armature core 3 is supported on end brackets 6a and 6b by bearings 5a and 5b. The end brackets 6a and 6b are fixed as securing members to a cylindrical yoke 7. Auxiliary poles 80 of a peripheral angle of $\theta_1$ made of a magnetic material, e.g., soft steel which act to intensify the magnetomotive force of the armature reaction are fixed to the yoke 7, and they face the armature core 3 via a gap. Magnetic pole pieces 9 of a peripheral angle of $\theta_2$ made of a magnetic material fixed to the yoke 7 and abutting on the auxiliary poles 80 in the peripheral direction are disposed partially on a demagnetizing side. Permanent magnets 8 are disposed around the inner periphery of the cylidrical yoke 7. Each of the permanent magnets 8 consists of a magnet 101 having a smaller thickness and disposed under the magnetic pole piece 9 on the side of the gap, and a magnet 102 having a greater thickness disposed on the demagnetizing side toward the end 11 thereof. The directions of magnetization of the magnets 101 and 102 are the same when these magnets are disposed in the same pole. The radial thickness of the magnet 101 is half of that of the magnet 102.

Figure 16:
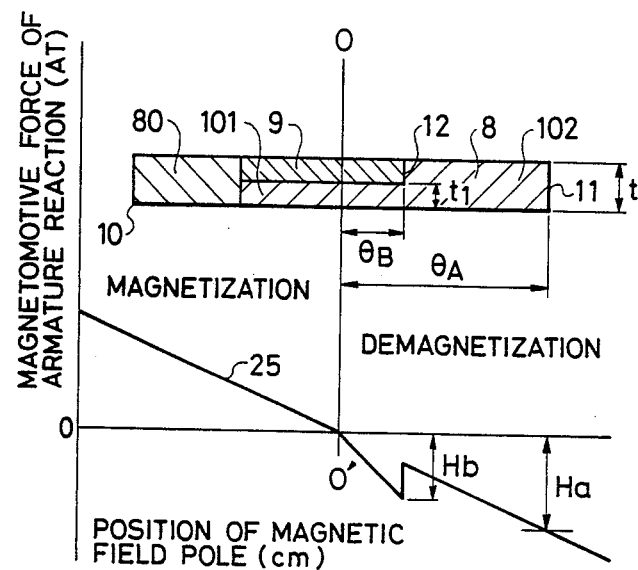
FIG. 16 is a diagram of the distribution of armature reaction applied to the magnetic pole shown in FIG. 14.

In the embodiment thus arranged, the magnetomotive force of the armature reaction acts on the field poles when the armature coil is energized. As shown in FIG. 16, the magnetomotive force of the armature reaction acts as a magnetizing force of the armature reaction acts as a magnetizing force on the left hand side of the center of magnetism 0—0' and as a demagnetizing force on the right hand side, when a current flows through the armature coil in the direction from behind the plane of the figure to the front. The demagnetizing force acting on the permanent magnet 8 has a maximum value of Ha at the demagnetizing end 11 of the magnet 102. In this embodiment, the radial thickness is made to have a larger thickness t so that the magnet 102 can resist this demagnetizing force Ha.

A demagnetizing force $H_B$ acts on the magnet 101 laminated and laid on the magnetic pole piece 9, at its portion 12 on the demagnetizing side. Since the angle $\theta_B$ from the center of the magnetism of the magnet 101 is about $\Delta$ of the angle $\theta_A$ of the magnet 102 and the thickness $t_1$ of the former is about a half of that of the latter, the demagnetizing force $H_B$ becomes approximately ⅜ times Ha, as apparent from the formula (1).

Figure 17:
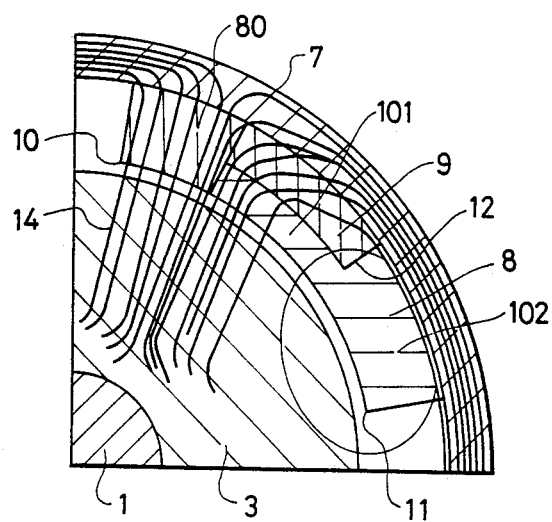
FIG. 17 is a magnetic flux distribution diagram of the motor of FIG. 14 during starting thereof.
Figure 18:
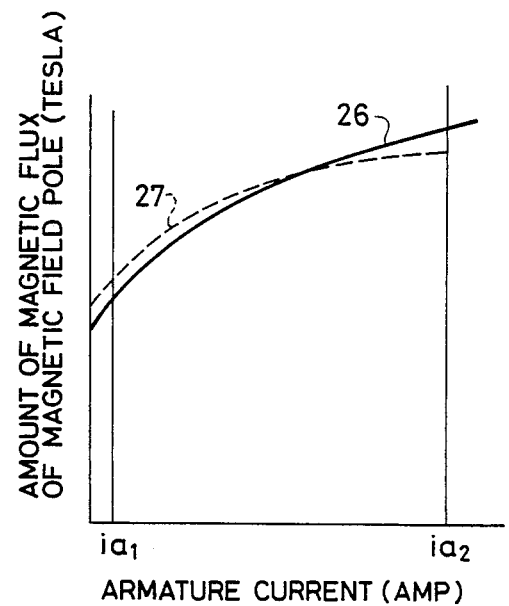
FIG. 18 is a graph of the amount of magnetic flux of the field pole corresponding to the armature current.

FIG. 17 shows the magnetic flux distribution of this embodiment. A large amount of magnetic flux is generated by the magnetizing effect of the armature reaction on each auxiliary pole 80 which is formed of a material of a high permeability. Each magnetic pole piece 9 formed of a magnetic material having a high permeability as that of the auxiliary pole acts to reduce the magnetomotive force consumption of the yoke, because it forms a part of the magnetic flux flow passage. The magnetic pole piece 9 leads the reaction magnetic flux of the armature reaction to the magnetizing side, thus acting in the same manner as in the case of the auxiliary pole. There is substantially no occurrence of short-circuited magnetic flux due to the armature reaction which does not contribute to the torque generation, since the magnetic gap between the armature core 3 and each magnetic pole piece 9 is large. Accordingly, as expressed by the solid line 26 in FIG. 18, a larger amount of magnetic flux is generated at a larger armature current $ia_2$. As described above in this embodiment, the permeance coefficient of the permanent magnet 8 is reduced because of the reduced radial thickness of the permanent magnet 101. For this reason, the amount of magnetic flux generated by the permanent magnet 101 is small compared with the conventional arrangements. Therefore, as expressed by the solid line 26 in FIG. 18, the amount of magnetic flux of the field pole is small at a small armature current $ia_1$ substantially in the non-loaded state, compared with that of the prior art expressed by the broken line 27.

In this embodiment of the present invention, the amount of the magnetic flux of the magnetic pole is small in the non-loaded state but it is large at a loaded point or during starting when the armature current is large, compared with the conventional arrangements. For this reason, the rotational speed in the non-loaded state is high and a large torque can be obtained in the loaded state or during starting of the machine. When this embodiment is used for a starter motor, the starter motor does not act as the load of the engine.

In addition, the volume of each permanent magnet 8 is reduced since the radial thickness of the magnet 101 is reduced while maintaining the resistance to the demagnetizing field of the armature reaction, as described above. Therefore, it is possible to realize a permanent magnet reduced which is reduced in weight and cost.

The description has been made with respect to a quadrupole permanent magnet field DC machine, but it is possible for the principle of the invention to be applied to other multipole machines such as dipole or six-pole machines. The present invention is effective for generators as well as electric motors. Each permanent magnet may be integrally formed or composed of two parts. The material of the permanent magnet is not limited specifically, and it is possible to use magnetic materials such as ferrite magnets, rare-earth magnets involving samarium cobalt, cerium, cobalt, neodymium, iron and boron magnets, and plastic magnets. The auxiliary pole and magnetic pole piece may be integrally formed. As shown in FIG. 16, the values of the angle $\theta_B$ and the thickness $t_1$ of the magnet 101 are respectively set to be about $\theta_A/3$ and $t/2$ in relation to those of the magnets 102, namely, the angle $\theta_A$ and the thickness $t$. However, it is possible to freely select the dimensions of the magnet 101 as long as a relationship: $\theta_A \times t_1 = \theta_B \times t$ is satisfied. For instance, $\theta_B$ may be one half of $\theta_A$ when the thickness $t_1$ of the magnet 101 is assumed to be about $t/2$.

Figure 19:
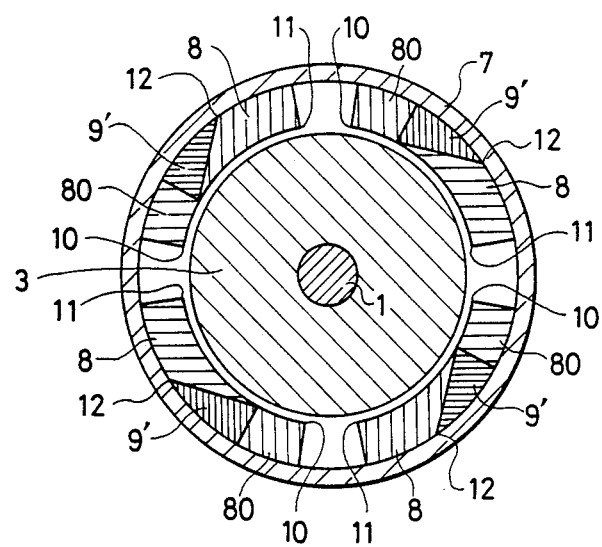

It is possible to arrange such that the radial thickness of an auxiliary pole 9' decreases toward the demagnetizing side, as shown in a radial cross section of FIG. 19. This arrangement facilitates the integral formation of the permanent magnets so as to save the cost and the labor of for assembling the machine. In the arrangement of FIG. 19, the thickness of the magnet is decreased at an end 12 compared with that shown in FIG. 14. The resistance to the demagnetizing force is thereby further improved as well as the magnetizing effect.

FIG. 20 shows in radial cross section of another altered example in which the edge of the demagnetizing end 12 of the auxiliary pole 9 which abuts on the magnet 102 is cut so as to form a gap 23, as is different from the arrangement of FIG. 14. The short circuit of the reaction magnetic flux is thereby prevented more positively and the leakage flux of the permanent magnet can be reduced.

The same effect in accordance with the present invention can be realized by an arrangement shown in a radial direction cross section of FIG. 21 in which the cross sectional shape of the magnetic pole piece 9 is triangular. The same effect as in FIG. 14 is also possible in an arrangement shown in a radial cross section of FIG. 22 in which a laminar auxiliary pole 80' is fixed, by welding, to the underside of a magnetic pole piece 9'' which is integrally formed from the magnetizing end portion to the demagnetizing side. The process of fixing the auxiliary pole 80' to the yoke is simplified by this arrangement. It is a matter of course that, as shown in FIG. 23, edge portions of the magnet portions 101 and 102 constituting the permanent magnet 8, which abut on, respectively, the auxiliary pole 80 and the magnetic pole piece 9 in the peripheral direction are cut so as to form a gap 130. In an arrangement shown in a radial cross section of FIG. 24, the auxiliary pole 80 and the magnetic pole piece 9 are disposed in such a manner as shown in FIG. 14, and a permanent magnet 8' is disposed alone at the demagnetizing end so as to form a substantial space 23 under the magnetic pole piece 9, thereby greatly reducing the weight of the magnet. The permanent magnet 8' may be provided in the form of L or a trapezoid L-shaped for the same effect. FIG. 25 shows another arrangement in which a line of the boundary between the magnetic pole piece 9 and the permanent magnet 8 is in the form of a circular arc.

In the embodiment shown in FIGS. 14 and 15, the auxiliary pole 80 and the magnetic pole piece 9 have the same axial length as that of the magnetic portions 101 and 102 of the permanent magnet 8, but the former length can be different from the latter. That is, when an axial length la of the armature core is assumed, the axial length of each of the auxiliary pole and magnetic pole piece is set about 1.2 la while the axial length of the permanent magnet 9 is set from 1.3 la to 2.0 la. It is thereby possible, during starting, to introduce a large amount of magnetic flux from the axial end of the permanent magnet 8 into the armature core, thus obtaining a larger amount of magnetic flux.

In the above described embodiment of the present invention, the first auxiliary pole and the magnetic pole piece disposed from the magnetizing side to a part of the demagnetizing side are provided, thereby conducting the magnetizing effect of the armature reaction. A larger amount of magnetic flux can be generated during starting or under load when the current flows at a higher rate, thus realizing a motor having a larger torque. The thickness of the permanent magnet portion disposed under the magnetic pole piece is reduced so that the permeance coefficient of the permanent magnet becomes small and the amount of magnetic flux in the non-loaded state of the motor is reduced. For this reason, the rotational speed of the motor in the non-loaded state can be increased and the reliability of the motor can be improved. In addition, it is possible to greatly reduce the weight of the permanent magnet and, hence, the cost of the motor, since the volume of the permanent magnet can be reduced according to the invention.

According to the present invention, as is apparent from the above description, the amount of magnetic flux can be increased under high load, for instance, at the time of starting, and can be reduced under low load, thus providing a permanent magnet field DC machine capable of outputting a higher torque under high load and capable of rotating at a higher rational speed under low load, namely, a device having preferable output characteristics for vehicle starters.

What we claim is:

1. A permanent magnet field DC machine having a rotor and a stator, said rotor comprising an armature core, an armature winding and a commutator, and said stator comprising a yoke and field poles having a center of magnetism including permanent magnets disposed on the inner periphery of said yoke, characterized in further comprising magnetic pole pieces made of a material whose permeability is greater than that of said permanent magnets the magnetic pole pieces being connected to said yoke, being interposed between said yoke and a portion of each of said permanent magnets and being disposed on a magnetizing side of a magnetomotive force of the armature reaction thereof relative to the center of the magnetism of each field pole, and said permanent magnets being connected to said magnetic pole pieces and said yoke facing to said rotor and disposed on both the magnetizing side and a demagnetizing side thereof.

2. A permanent magnet field DC machine according to claim 1, wherein each of said permanent magnets comprises a rare-earth magnet.

3. A permanent magnet field DC machine according to claim 1, wherein each of said magnetic pole pieces is formed so as to face said armature core at the magnetizing side and to gradually decrease in radial thickness from said magnetizing side toward the demagnetizing side and said permanent magnet is formed so as to gradually decrease in radial thickness from a portion located on said demagnetizing side toward the magnetizing side.

4. A permanent magnet field DC machine according to claim 3, wherein the sectional configuration of each of said magnetic pole pieces is substantially triangular and the sectional configuration of said permanent magnet is substantially trapezoidal.

5. A permanent magnet field DC machine having a rotor and a stator, said rotor comprising an armature core, an armature winding, and a commutator, and said stator comprising a yoke and permanent magnets disposed on an inner periphery of said yoke and auxiliary poles made of a magnetic material disposed parallel with said permanent magnets, characterized in that each of said auxiliary poles comprises a first auxiliary pole connected to said yoke having a radial thickness and disposed at a magneizing side of a magnetomotive force of the armature reaction thereof, and a second auxiliary pole connected to said yoke and the first auxiliary pole and having a smaller radial thickness compared with the thickness of the first auxiliary pole and disposed on the magnetizing side and partially on a demagnetizing side thereof, and said permanent magnets comprising a first magnet portion connected to the first auxiliary pole and the second auxiliary pole and facing to said rotor, and a second magnet portion connected to an end of said second auxiliary pole and said first magnet portion on said inner periphery of said yoke and disposed at said demagnetizing side thereof.

6. A permanent magnet field DC machine according to claim 5, wherein the radial thickness of said second auxiliary pole is set to be constant from said magnetizing side to said demagnetizing side.

7. A permanent magnet field DC machine according to claim 5, wherein the radial thickness of said second auxiliary pole gradually decreases from said magnetizing side to said demagnetizing side.

8. A permanent magnet field DC machine according to claim 5, wherein each of said permanent magnet is formed of a rare-earth magnet.

9. A permanent magnet field DC machine having a rotor and a stator, said rotor comprising an armature core, an armature winding and a commutator, and said stator comprising a yoke and field poles having a center of magnetism including permanent magnets disposed on the inner periphery of said yoke, and magnetic pole pieces made of a material whose permeability is greater than that of said permanent magnets, the magnetic pole pieces being connected to said yoke, being interposed between said yoke and a portion of each of said permanent magnets and being disposed in a range from a magnetizing end of a magnetomotive force of the armature reaction thereof relative to the center of the magnetism of each field pole to a portion of a demagnetizing side thereof, and said permanent magnets being connected to said magnetic pole pieces and said yoke facing to said rotor and disposed on both a magnetizing side and the demagnetizing side thereof.

10. A permanent magnet field DC machine having a rotor and a stator;

said rotor having an armature core, an armature winding and a commutator;

said stator comprising a yoke, field poles having a center of magnetization including permanent magnets connected to the inner periphery of said yoke and facing said rotor, and magnetic pole pieces made of a material having a permeability which is greater than the permeability of the permanent magnets, said pole pieces being magnetically connected directly to the yoke and there being on opposite sides of the center of the magnetization of each field pole a magnetizing and a demagnetizing magnetomotive force due to armature reaction;

said pole pieces being connected to both the permanent magnets and said yoke, interposed between the yoke and a portion of each of said permanent magnets, and disposed on a magnetizing side of the magnetomotive force due to the armature reaction; and said permanent magnets facing said rotor and disposed on both the magnetizing side and the demagnetizing side of said field poles.

* * * * *